United States Patent
Luo et al.

(10) Patent No.: US 7,358,710 B2
(45) Date of Patent: Apr. 15, 2008

(54) TEMPERATURE-COMPENSATED INDUCTOR DCR DYNAMIC CURRENT SENSING

(75) Inventors: Shiguo Luo, Austin, TX (US); Zhihong Ye, Austin, TX (US); Guangyong Zhu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 158 days.

(21) Appl. No.: 11/406,487

(22) Filed: Apr. 18, 2006

(65) Prior Publication Data

US 2007/0241727 A1    Oct. 18, 2007

(51) Int. Cl.
*G05F 1/40* (2006.01)
(52) U.S. Cl. ............... 323/282; 323/272; 323/277
(58) Field of Classification Search ........ 323/282–288, 323/272–277, 222, 224; 363/64, 17, 97
See application file for complete search history.

(56) References Cited

U.S. PATENT DOCUMENTS

| | | | | |
|---|---|---|---|---|
| 3,211,989 A | * | 10/1965 | Martin et al. ................ | 323/279 |
| 5,774,734 A | * | 6/1998 | Kikinis et al. .............. | 713/300 |
| 5,939,871 A | * | 8/1999 | Tanaka ....................... | 323/285 |
| 5,982,160 A | | 11/1999 | Walters et al. .............. | 323/282 |
| 6,064,187 A | * | 5/2000 | Redl et al. .................. | 323/285 |
| 6,441,597 B1 | | 8/2002 | Lethellier .................. | 323/282 |
| 6,469,481 B1 | | 10/2002 | Tateishi ..................... | 323/282 |
| 6,738,432 B2 | * | 5/2004 | Pehlke et al. ............... | 375/300 |
| 6,791,341 B2 | | 9/2004 | Stenai et al. ................ | 324/654 |
| 6,812,677 B2 | | 11/2004 | Walters et al. ............. | 323/277 |
| 6,833,690 B2 | | 12/2004 | Walters et al. ............. | 323/277 |

OTHER PUBLICATIONS

Maxim Integrated Products, "TFT-LCD Power-Supply Controllers," pp. 1-28; 19-3047; Rev 0; Oct. 2003, www.maxim-ic.com.
Intersil, 6 Phase VRII PWM Controller with 8-Bit VID Code Capable of Precision $R_{DS(ON)}$ or DCR Differential Current Sensing for Applications in Which Supply Voltage is Higher than 5V, Data Sheet, pp. 1-33, FN9225.0, www.intesil.com, Aug. 4, 2005.

* cited by examiner

Primary Examiner—Rajnikant B. Patel
(74) Attorney, Agent, or Firm—Baker Botts L.L.P.

(57) ABSTRACT

A resister network having a negative temperature coefficient (NTC) may be utilized to create a temperature compensated equivalent resistance "R" for a current sensing RC network used in measuring inductor current of a DC-to-DC converter or a general switching regulator that needs to use inductor current as a control signal. The NTC resistor of the RC network effectively compensates for the positive temperature coefficient of the switching regulator inductor's inherent DC resistance (DCR). Keeping the time constants of the RC network and the switching regulator inductor substantially matched improves operation of cycle by cycle based control modes such as peak current sensing by the switching regulator controller in performing peak current control for the DC-to-DC converter.

19 Claims, 3 Drawing Sheets

Figure 2 (Prior Technology)

TEMPERATURE-COMPENSATED INDUCTOR DCR DYNAMIC CURRENT SENSING

TECHNICAL FIELD

The present disclosure relates generally to DC-to-DC converters in information handling systems and, more particularly, to compensation for inductor direct current resistance (DCR) temperature changes when measuring current through the inductor.

BACKGROUND

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Information handling system electronic modules require regulated direct current (DC) voltages generally supplied from switching regulators. A general switching regulator comprises control and DC-to-DC converter circuitries, and more particularly, the main circuitry of a DC-to-DC converter comprises an inductor, a capacitor, a control switch and a synchronous rectification switch. These power controlling switches may be power field effect transistors. A switching regulator controller controls turn-on and turn-off of the control and synchronous rectification switches so as to maintain a substantially constant voltage at the output of the DC-to-DC converter. The switching regulator controller may use measured output voltage and measured current supplied by the DC-to-DC converter for determining proper operation thereof. The output voltage and current may be measured with voltage and current sensors. Output voltage may easily be measured with analog voltage circuits, e.g., a simple voltage divider and also an analog-to-digital converter (ADC). The output current measurement is more problematic since any series resistance in the current path of the inductor will degrade conversion efficiency of the DC-to-DC converter. A better way of measuring current supplied by the DC-to-DC converter, e.g., current through the switching inductor, is to measure a voltage developed across the inductor's inherent DC resistance (DCR). This may be accomplished with a resistor-capacitor (RC) current detection circuit in parallel with the DC-to-DC converter inductor. A typical parallel RC current detection circuit used for determining current in a switching regulator inductor is more fully described in U.S. Pat. No. 6,469,481 to Tateishi, and is incorporated by reference herein for all purposes.

SUMMARY

However, a problem exists in that the inductor DCR varies its resistance value with temperature, e.g., about plus 0.38 percent per degree Centigrade. Therefore, current measurement accuracy may be significantly affected. Much effort has been expended in how to properly calibrate sensed inductor current magnitude accurately over a range of operating temperatures. However, another significant issue that has been rarely addressed is time constant mismatching due to inductor DCR value changes over the operating temperature range. The time constants referred to herein may be defined as $t_1=L/DCR$ and $t_2=R*C$, where L is the inductance value of the inductor, DCR is the DC resistance of the inductor, R is the resistance value of the parallel connected current sense resistor, and C is the capacitance value of the parallel connected current sense capacitor. When $t_1$ and $t_2$ do not substantially match, the time constant mismatch may introduce significant control error to the real time switching regulator controller. For example, a time constant mismatch will cause cycle by cycle real time sensing error such as distorted waveform slope and sampling point delay. This may significantly affect the operation of cycle by cycle based control modes such as peak current sensing by the switching regulator controller in performing peak current control.

According to a specific example embodiment of this disclosure, a DC-to-DC converter having temperature-compensated inductor direct current resistance (DCR) dynamic current sensing may comprise: an inductor having an inductance and a direct current resistance (DCR), wherein the DCR has a positive temperature coefficient (PTC); a control switch coupled to the inductor and an input voltage; a synchronous rectification switch coupled to the inductor and a common reference; a switching regulator controller coupled to the control and synchronous rectification switches, wherein the switching regulator controller controls the control and synchronous rectification switches so as to produce a regulated output voltage from the inductor; a current sensing capacitor coupled to the inductor, wherein a voltage across the current sensing capacitor is substantially proportional to a current through the inductor; and a resistor network having a negative temperature coefficient (NTC) is coupled to the inductor and the current sensing capacitor, wherein a combination of the NTC resistor network and the current sensing capacitor have a time constant substantially the same as a time constant of a combination of the inductance and the DCR of the inductor over a desired operating temperature range.

According to another specific example embodiment of this disclosure, a method of compensating for temperature variations of an inductor direct current resistance (DCR) during dynamic current sensing of the inductor may comprise the steps of: forming a resistor network having a negative temperature coefficient (NTC); coupling the NTC resistor network to a current sensing capacitor, wherein the NTC resistor network and the current sensing capacitor have a first time constant; coupling the NTC resistor network and the current sensing capacitor to an inductor having a positive temperature coefficient (PTC) direct current resistance (DCR), wherein the DCR and inductance of the inductor have a second time constant; adjusting the NTC resistor network so that the first time constant and second time constant are substantially the same over a desired operating temperature range; and measuring a voltage across the current sensing capacitor for determining a load current through the inductor.

BRIEF DESCRIPTION OF THE DRAWINGS

A more complete understanding of the present disclosure thereof may be acquired by referring to the following description taken in conjunction with the accompanying drawings wherein.

Figure 1:
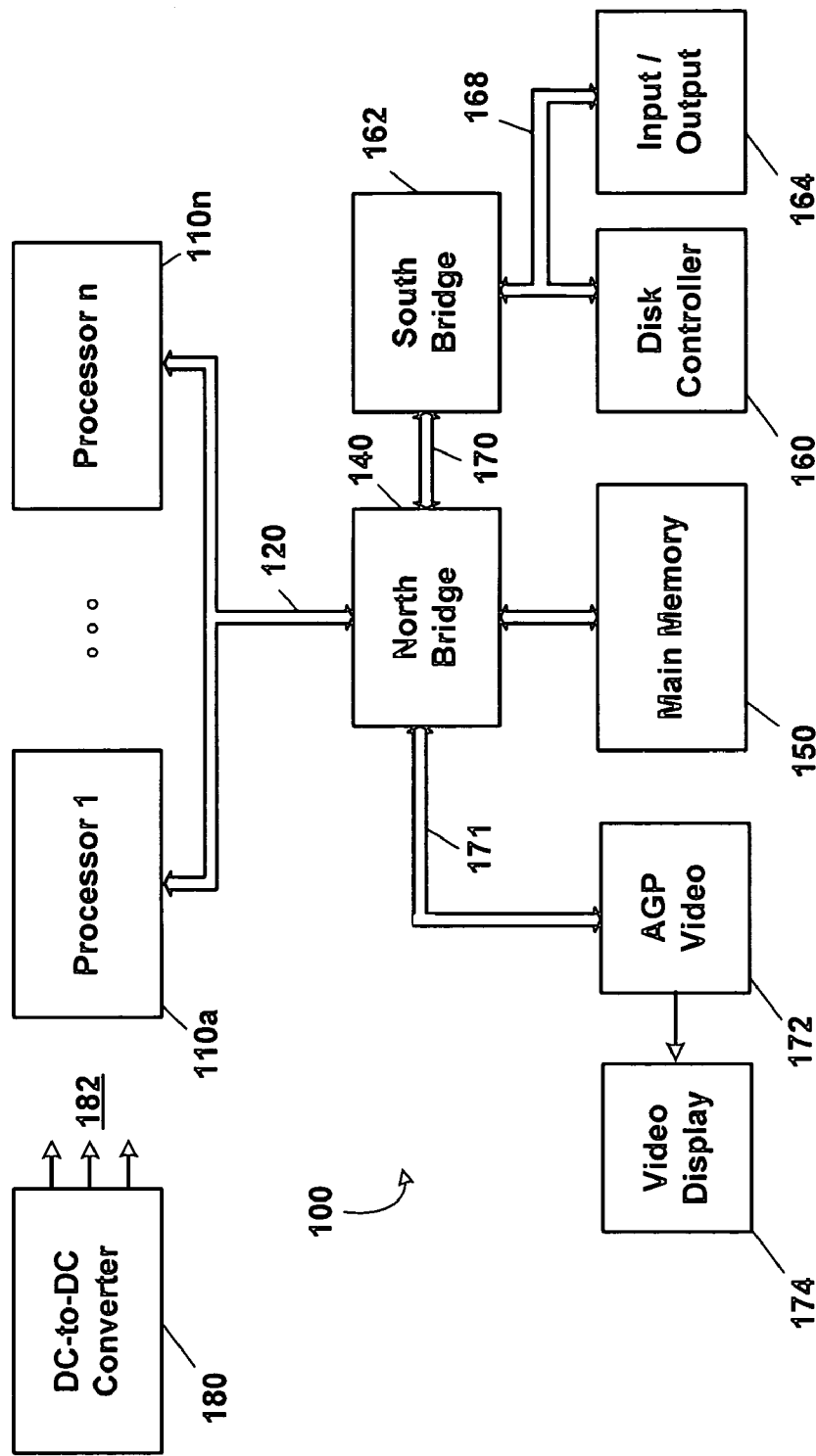
FIG. 1 is a schematic block diagram of an information handling system, according to a specific example embodiment of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of a specific example embodiment is schematically illustrated. Like elements in the drawings will be represented by like numbers, and similar elements will be represented by like numbers with a different lower case letter suffix.

Referring to FIG. 1, depicted is an information handling system having electronic components mounted on at least one printed circuit board (PCB) (motherboard) and communicating data and control signals therebetween over signal buses, according to a specific example embodiment of the present disclosure. In one example embodiment, the information handling system is a computer system. The information handling system, generally referenced by the numeral 100, comprise at least one physical processor 110, generally represented by processors 110a-110n, coupled to a host bus(es) 120. A north bridge 140, which may also be referred to as a memory controller hub or a memory controller, is coupled to a main system memory 150. The north bridge 140 is coupled to the at least one processor 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus(es), e.g., PCI bus 170, AGP bus 171 coupled to a video graphics interface 172 which drives a video display 174. A third bus(es) 168 may also comprise other industry standard buses or proprietary buses, e.g., ISA, SCSI, I²C, SPI, USB buses through a south bridge(s) (bus interface) 162. A disk controller 160 and input/output interface(s) 164 may be coupled to the third bus(es) 168. At least one DC-to-DC converter may be adapted to provide appropriate DC voltage(s) 182 to the aforementioned information handling system components, e.g., at least one processor 110.

Figure 2:
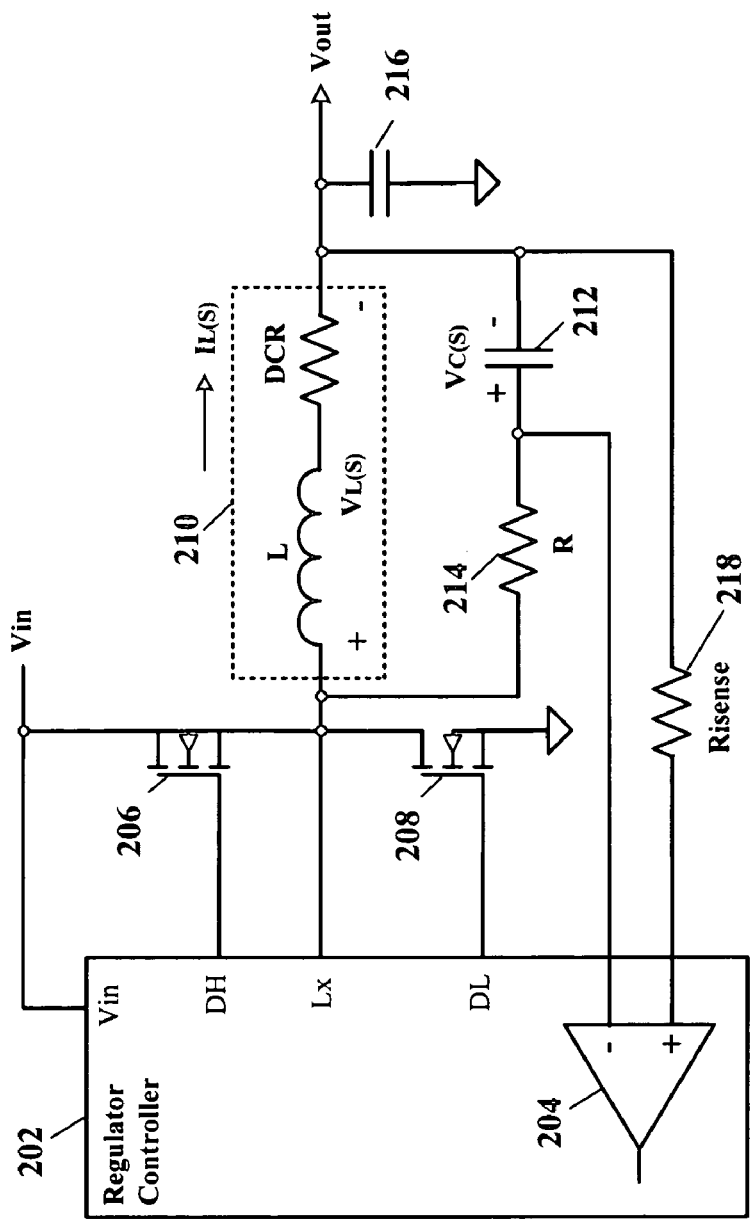
FIG. 2 is a schematic diagram of a prior technology DC-to-DC converter having an inductor DCR current measurement circuit.

Referring now to FIG. 2, depicted is a schematic diagram of a prior technology DC-to-DC converter having an inductor DCR current measurement circuit. A typical DC-to-DC converter, e.g., buck converter, may comprise a control switch 206, e.g., power MOSFET, a synchronous rectification switch 208, e.g., power MOSFET, an inductor 210, an output filter capacitor 208, and a regulator controller 202. The regulator controller 202 may comprise a voltage reference (not shown), a pulse width modulation (PWM) generator (not shown), and sensing circuits that measure the DC-to-DC converter output current and voltage. The regulator controller 202 maintains a constant output voltage, Vout, by controlling the times in which the control switch 206 and synchronous rectification switch 208 are on and off. By alternately coupling the inductor 210 to Vin and ground the DC-to-DC converter may generate a regulated output voltage, Vout. A DC-to-DC buck converter is shown, however, any type of DC-to-DC converter, e.g., buck-boost, boost, etc., may be used in accordance with the teachings of this disclosure.

The inductor 210 comprises an inductance L and a series direct current resistance (DCR) inherent in the wire making up the inductance L. Channel current $I_L(s)$, i.e., current supplied to the information handling system 100, passes through the inductance L and also must pass through the DCR. A resistor-capacitor (RC) networking comprising resistor 214 and sensing capacitor 212 may be used to measure the voltage drop $V_L(s)$ across the inductance L and DCR, as more fully described in U.S. Pat. No. 6,469,481 to Tateishi, incorporated by reference herein for all purposes.

For example, the voltage $V_C(s)$ on the sensing capacitor 212 is proportional to the channel current $I_L(S)$ and may be expressed in the frequency domain as:

$$V_C(s)=(sL/DCR+1)*(DCR*I_L(s))/(sRC+1).$$

If the RC network (resistor 214 and sensing capacitor 212) are selected such that the RC time constant (R*C) substantially matches the inductor 210 time constant (L/DCR), then the voltage $V_C(s)$ across the sensing capacitor 212 is substantially equal to the voltage drop across the DCR since the DCR represents the resistive component of the inductor 210. Therefore, the channel current $I_L(s)$ may be computed from the measured voltage drop $V_C(s)$ and the DCR resistance value and the detected $v_c(t)$ may be used to timely track $i_L(t)$ in the time domain. By using a very low-offset current amplifier 204, the voltage $V_C(s)$ on the sensing capacitor 212 may be replicated across a sense resistor 218. Thus the value of the current $i_L(t)$ may be determined at the output of the amplifier 204 and thereby may be used by the regulator controller 202 to measure the amount of current through the inductor 210.

The inductor 210 DCR resistance value varies with temperature, e.g., about plus 0.38 percent per degree Centigrade. Therefore, current measurement accuracy may be significantly affected. Another significant issue is time constant mismatching due to the inductor 210 DCR value changing over the operating temperature range. The RC time constants referred to hereinabove may be defined as $t_1=L/DCR$ and $t_2=R*C$, where L is the inductance value of the inductor 210, DCR is the DC resistance of the inductor 210, R is the resistance value of the parallel connected current sense resistor 214, and C is the capacitance value of the parallel connected current sense capacitor 212. When $t_1$ and $t_2$ do not substantially match, the time constant mismatch may introduce significant control errors to the real time switching regulator controller 202. For example, a time constant mismatch will cause cycle by cycle real time sensing error such as distorted waveform slope and sampling point delay. This may significantly affect the operation of cycle by cycle based control modes such as peak current sensing by the switching regulator controller in performing peak current control.

Figure 3:
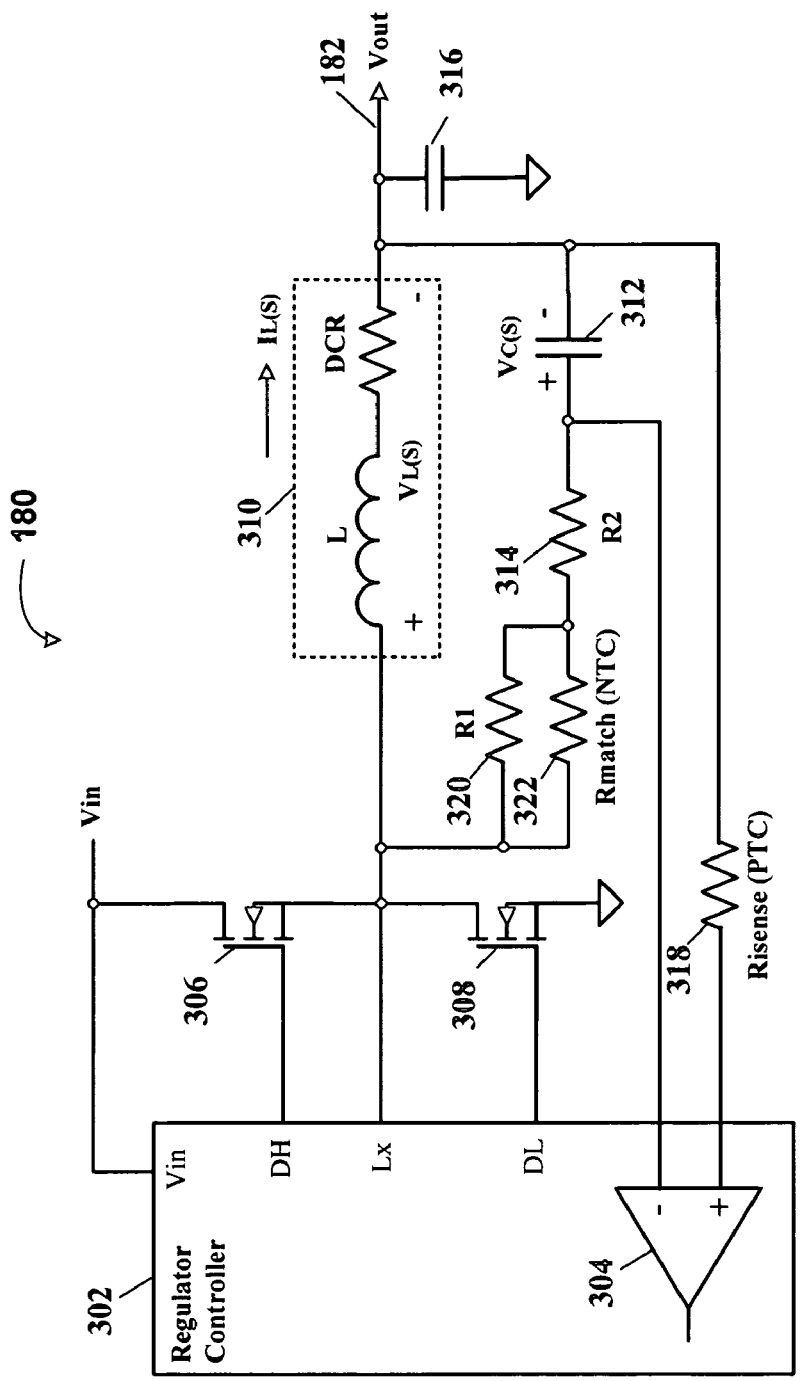
FIG. 3 is a schematic diagram of a DC-to-DC converter having a temperature-compensated time constant matched inductor DCR current measurement circuit, according to a specific example embodiment of the present disclosure.

Referring now to FIG. 3, depicted is a schematic diagram of a DC-to-DC converter having a temperature-compensated time constant matched inductor DCR current measurement circuit, according to a specific example embodiment of the present disclosure. To achieve timely and accurate current sensing of the current through the inductor 310 of the DC-to-DC converter 180, the time constant of the current sensing RC network, comprising sense capacitor 312 and resistors 314, 320 and 322, has to substantially match the time constant of the inductor 310 (determined by L/DCR). According to teachings of this disclosure, a resistor network having a negative temperature coefficient (NTC) may be utilized to create a temperature compensated equivalent resistance "R" of the current sensing RC network. According to the specific example embodiment shown in FIG. 3, a temperature compensated equivalent resistance may be determined by:

$$R=R1*Rmatch/(R1+Rmatch)+R2,$$

where the values of R1 (resistor 320), R2 (resistor 314) and Rmatch (NTC resistor 322) are selected so as to substantially cancel the positive temperature coefficient resistance change of the DCR. By doing so, the time constants $t_1=L/DCR$ and $t_2=R*C$ may be maintained as substantially matched over a wide operating temperature range. It is contemplated and within the scope of this disclosure that other combinations of series and/or parallel connected resistors, some NTC and some not, may be utilized for substantially canceling the positive temperature coefficient resistance change of the DCR. In addition, the sense resistor 318 may have a positive temperature coefficient (PTC) for calibrating measured (detected) current magnitude over the operating temperature range of the DC-to-DC converter 180.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A DC-to-DC converter having temperature-compensated inductor direct current resistance (DCR) dynamic current sensing, comprising:
    an inductor having an inductance and a direct current resistance (DCR), wherein the DCR has a positive temperature coefficient (PTC);
    a control switch coupled to the inductor and an input voltage;
    a synchronous rectification switch coupled to the inductor and a common reference;
    a switching regulator controller coupled to the control and synchronous rectification switches, wherein the switching regulator controller controls the control and synchronous rectification switches so as to produce a regulated output voltage from the inductor;
    a current sensing capacitor coupled to the inductor, wherein a voltage across the current sensing capacitor is substantially proportional to a current through the inductor; and
    a resistor network having a negative temperature coefficient (NTC) is coupled to the inductor and the current sensing capacitor, wherein a combination of the NTC resistor network and the current sensing capacitor have a time constant substantially the same as a time constant of a combination of the inductance and the DCR of the inductor over a desired operating temperature range.

2. The DC-to-DC converter according to claim 1, wherein the voltage across the current sensing capacitor is coupled to the switching regulator controller and is used for measuring the current through the inductor.

3. The DC-to-DC converter according to claim 2, wherein the voltage across the current sensing capacitor is coupled to an operational amplifier in the switching regulator controller.

4. The method according to claim 3, wherein the operational amplifier is a very low offset current amplifier.

5. The DC-to-DC converter according to claim 4, further comprising a sense resistor having a positive temperature coefficient (PTC) coupled between the current sensing capacitor and the very low offset current amplifier for maintaining a calibrated voltage from the current sensing capacitor over the desired operating temperature range.

6. The DC-to-DC converter according to claim 1, wherein the resistor network comprises at least one standard resistor and at least one NTC resistor connected in parallel.

7. The DC-to-DC converter according to claim 1, wherein the resistor network comprises at least one standard resistor and at least one NTC resistor connected in series.

8. The DC-to-DC converter according to claim 1, wherein the resistor network comprises a plurality of standard resistors and at least one NTC resistor connected in series and parallel.

9. The DC-to-DC converter according to claim 1, wherein the DC-to-DC converter is a buck DC-to-DC converter.

10. The DC-to-DC converter according to claim 1, wherein the DC-to-DC converter is a boost DC-to-DC converter.

11. The DC-to-DC converter according to claim 1, wherein the DC-to-DC converter is a buck-boost DC-to-DC converter.

12. The DC-to-DC converter according to claim 1, wherein the control and synchronous rectification switches are power metal oxide semiconductor field effect transistors (power MOSFETs).

13. A method of compensating for temperature variations of an inductor direct current resistance (DCR) during dynamic current sensing of the inductor, said method comprising the steps of:
    forming a resistor network having a negative temperature coefficient (NTC);
    coupling the NTC resistor network to a current sensing capacitor, wherein the NTC resistor network and the current sensing capacitor have a first time constant;
    coupling the NTC resistor network and the current sensing capacitor to an inductor having a positive temperature coefficient (PTC) direct current resistance (DCR), wherein the DCR and inductance of the inductor have a second time constant;
    adjusting the NTC resistor network so that the first time constant and second time constant are substantially the same over a desired operating temperature range; and
    measuring a voltage across the current sensing capacitor for determining a load current through the inductor.

14. The method according to claim 13, further comprising the step of determining the load current of the inductor by coupling the voltage across the current sensing capacitor to an operational amplifier.

15. The method according to claim 14, wherein the operational amplifier is a very low offset current amplifier.

16. The method according to claim 15, further comprising the step of providing a sense resistor having a positive temperature coefficient (PTC) coupled between the current sensing capacitor and the very low offset current amplifier for maintaining a calibrated voltage from the current sensing capacitor over the desired operating temperature range.

17. The method according to claim 13, wherein the resistor network comprises at least one standard resistor and at least one NTC resistor connected in parallel.

18. The method according to claim 13, wherein the resistor network comprises at least one standard resistor and at least one NTC resistor connected in series.

19. The method according to claim 13, wherein the resistor network comprises a plurality of standard resistors and at least one NTC resistor connected in series and parallel.

* * * * *